US012537597B2

(12) United States Patent
Perry

(10) Patent No.: US 12,537,597 B2
(45) Date of Patent: *Jan. 27, 2026

(54) MULTI-PATH, SMART OPTICAL TIME-DOMAIN REFLECTOMETER

(71) Applicant: AT&T Intellectual Property I, L.P., Atlanta, GA (US)

(72) Inventor: Ricky Perry, Cumming, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 408 days.

This patent is subject to a terminal disclaimer.

(21) Appl. No.: 18/166,281

(22) Filed: Feb. 8, 2023

(65) Prior Publication Data
US 2023/0188209 A1    Jun. 15, 2023

Related U.S. Application Data

(63) Continuation of application No. 17/195,160, filed on Mar. 8, 2021, now Pat. No. 11,606,139.

(51) Int. Cl.
*H04B 10/071* (2013.01)
*G01M 11/00* (2006.01)
(Continued)

(52) U.S. Cl.
CPC ....... *H04B 10/071* (2013.01); *G01M 11/3109* (2013.01); *H04J 3/1694* (2013.01); *H04J 14/0232* (2013.01)

(58) Field of Classification Search
CPC ......... G01M 11/3145; G01M 11/3109; G01M 11/3136; H04B 10/07; H04B 10/0791
See application file for complete search history.

(56) References Cited

U.S. PATENT DOCUMENTS 8,655,167 B1 *  2/2014 Lam .................... H04J 14/0227
                                                     398/16
8,693,866 B1 *  4/2014 Lam .................... H04B 10/071
                                                     398/16
(Continued)

OTHER PUBLICATIONS

"Advanced OTDR Analysis—Has technology made it a Lost Art?", Fluke Networks, www.flukenetworks.com, 2008, 5 pages.
(Continued)

*Primary Examiner* — Tanya T Motsinger
(74) *Attorney, Agent, or Firm* — Guntin & Gust, PLC; Daniel P. Williams

(57) ABSTRACT

Aspects of the subject disclosure may include, for example, determining distinct timing offsets between an input port and output ports of a multiport optical device. An optical signal is injected at an input port of the device to obtain output signals at the output ports, which are injected into downstream fibers. An optical multipath return signal is received via the input port of the device, including a combination of measured events including reflections, backscatter, or both. A number of similar events expected in the number of downstream optical fibers is calculated to obtain an expected multipath signature based on configuration data. Results of the optical multipath return signal are then compared to the expected multipath signature to obtain comparison results. One of the measured events is distinguished from the others based on the first comparison results and the distinct timing offsets. Other embodiments are disclosed.

20 Claims, 10 Drawing Sheets

(51) Int. Cl.
*H04J 3/16* (2006.01)
*H04J 14/02* (2006.01)

(56) References Cited

U.S. PATENT DOCUMENTS

| | | | |
|---|---|---|---|
| 9,240,836 B1* | 1/2016 | Chen | G01M 11/3136 |
| 9,344,189 B2* | 5/2016 | Vilela de Faria | G01M 11/3127 |
| 11,606,139 B2* | 3/2023 | Perry | H04B 10/272 |
| 2004/0096222 A1* | 5/2004 | Cagenius | H04B 10/25755 |
| | | | 398/115 |
| 2008/0031624 A1 | 2/2008 | Smith et al. | |
| 2009/0080895 A1 | 3/2009 | Zarris | |
| 2011/0109911 A1 | 5/2011 | Podoleanu | |
| 2011/0129226 A1 | 6/2011 | Vleugels et al. | |
| 2012/0039598 A1 | 2/2012 | Dahlfort | |
| 2012/0163800 A1 | 6/2012 | Urban | |
| 2013/0051791 A1 | 2/2013 | Zhao et al. | |
| 2013/0076861 A1* | 3/2013 | Sternklar | G01S 17/32 |
| | | | 348/46 |
| 2013/0077975 A1 | 3/2013 | Dvir et al. | |
| 2013/0259466 A1 | 10/2013 | Chen et al. | |
| 2013/0259469 A1* | 10/2013 | Smith | H04J 14/0282 |
| | | | 398/16 |
| 2013/0259470 A1 | 10/2013 | Zhong et al. | |
| 2014/0003806 A1 | 1/2014 | Urban et al. | |
| 2014/0126900 A1 | 5/2014 | Urban | |
| 2014/0147109 A1 | 5/2014 | Urban et al. | |
| 2014/0212131 A1 | 7/2014 | Zhang | |
| 2014/0334282 A1* | 11/2014 | Nakata | G11B 7/005 |
| | | | 369/175 |
| 2015/0023658 A1 | 1/2015 | Vilela De Faria et al. | |
| 2015/0323419 A1* | 11/2015 | Myong | G01M 11/3145 |
| | | | 356/73.1 |
| 2015/0381271 A1 | 12/2015 | Li et al. | |
| 2016/0098913 A1* | 4/2016 | Vastmans | G08B 13/08 |
| | | | 356/73.1 |
| 2016/0323033 A1* | 11/2016 | Vall-Llosera | H04B 10/0791 |
| 2020/0374026 A1 | 11/2020 | Wang et al. | |
| 2021/0096217 A1 | 4/2021 | Jadidian et al. | |
| 2021/0211786 A1* | 7/2021 | Loprieno | H04B 10/0771 |
| 2021/0255057 A1* | 8/2021 | Paradis | G01M 11/3127 |
| 2021/0278314 A1* | 9/2021 | Xia | G01M 7/00 |
| 2022/0286202 A1* | 9/2022 | Perry | H04J 14/0232 |
| 2024/0297711 A1* | 9/2024 | Takeuchi | H04L 7/0075 |

OTHER PUBLICATIONS

"Tracing Live or Dark FTTx PONs through Splitter using OFL280", FAFL: Test and Inspection, www.AFLglobal.com, 2011, 6 pages.

Sheldon, "ABC of PON: Understanding OLT, ONU, ONT and ODN", FS Community, https://community.fs.com/blog/abc-of-pon-understanding-olt-onu-ont-an, May 13, 2015, 7 pages.

* cited by examiner

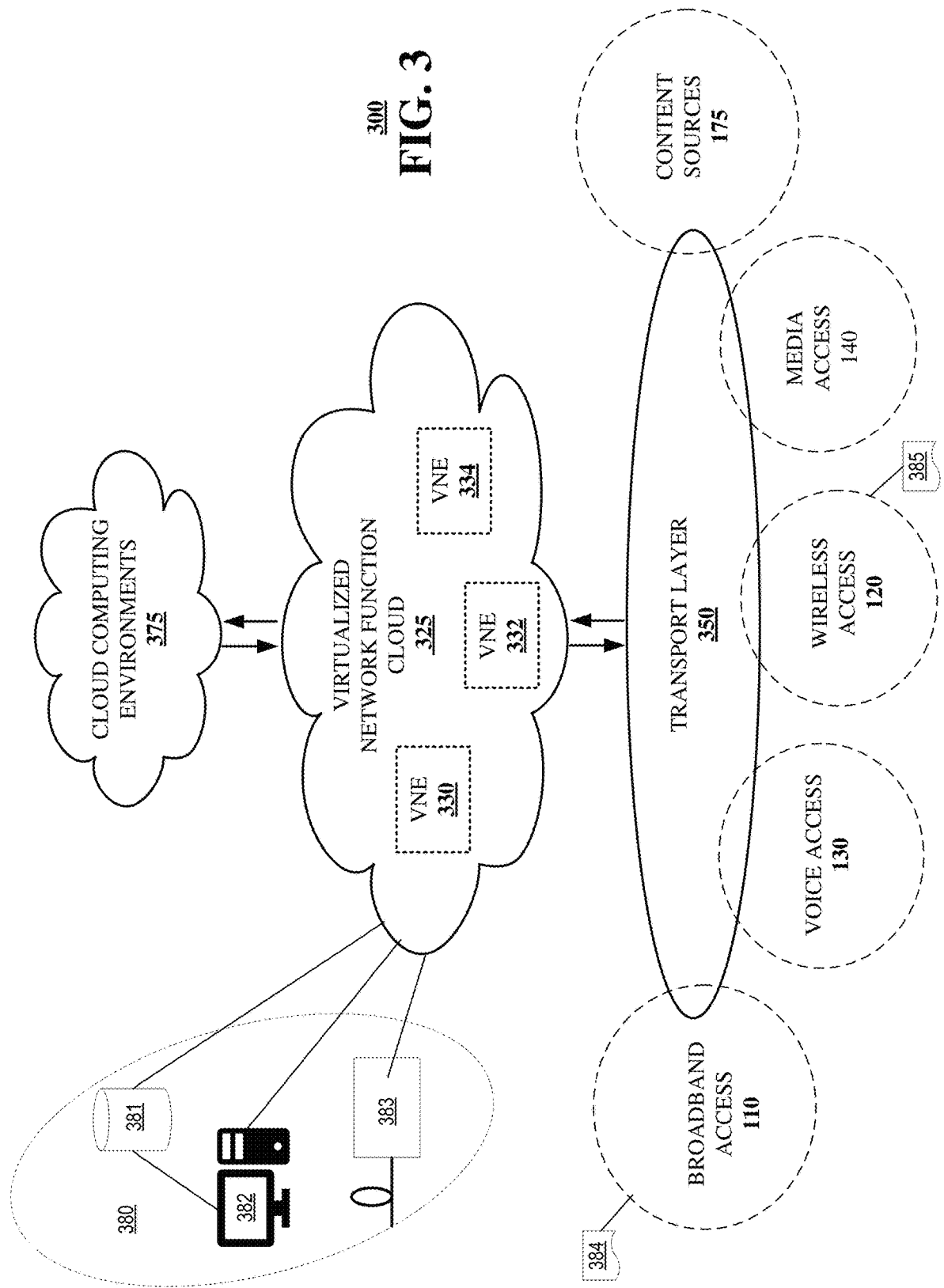

MULTI-PATH, SMART OPTICAL TIME-DOMAIN REFLECTOMETER

CROSS REFERENCE TO RELATED APPLICATIONS

This application is a continuation of U.S. patent application Ser. No. 17/195,160 filed on Mar. 8, 2021. All sections of the aforementioned application(s) and/or patent(s) are incorporated herein by reference in their entirety.

FIELD OF THE DISCLOSURE

The subject disclosure relates to a multi-path, smart optical time-domain reflectometer.

BACKGROUND

Digital telecommunications, such as networks that facilitate a communication of data, voice, video, etc., between parties or between a content distribution service and subscribers, may utilize a passive optical network (PON) between a central office or exchange and equipment of one or more subscribers. A PON includes an optical fiber and/or other passive components along a path between the central office and equipment of subscribers. For example, a single fiber may run from the central office to a passive splitter located near a group of subscribers, such as a neighborhood or office complex. Individual fibers may run from the splitter to equipment of individual subscribers or sub-groups of subscribers. In at least some applications, splitters may be cascaded to reach a greater number of subscribers.

A PON typically includes an optical line termination or terminal (OLT), located at the central office, and a number of optical network terminations or terminals (ONTs) located at the subscriber's premises (e.g., home, office building, etc.). The PON also includes optical fibers with one or more optical signal splitters between the OLT and the ONTs. In a downstream direction, i.e., data transmitted from the OLT to an ONT, data may be broadcast from the OLT to all of the ONTs on the PON. An ONT may select the data to receive by matching an address embedded in the data units to a previously provisioned or learned address. In an upstream direction, i.e., data transmitted from an ONT to the OLT, the data units may be time-domain multiplexed.

An Optical Time-Domain Reflectometer (OTDR) is an instrument that may be used to characterize an optical waveguide system, such as an optical fiber cable or network, by injecting a series of optical pulses into an optical fiber system under test and extracting any light returned at the same end of the fiber as may result from scattering (Rayleigh backscatter) and/or reflections from discontinuities along the fiber, such as connectors, splices, breaks and the like. Data produced by the OTDR are typically used to create a picture, e.g., a graph, typically referred to as a "trace" or "signature" that provides valuable information about the system under test. In fiber, light is scattered in all directions, including some scattered back toward the source as shown here. The OTDR uses this "backscattered light" to make measurements along with reflected light from connectors or cleaved fiber ends. Since the measurements are performed from one end of the fiber, the light injected by the OTDR goes out and comes back. Accordingly, OTDR takes this into account by dividing time delays in half.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
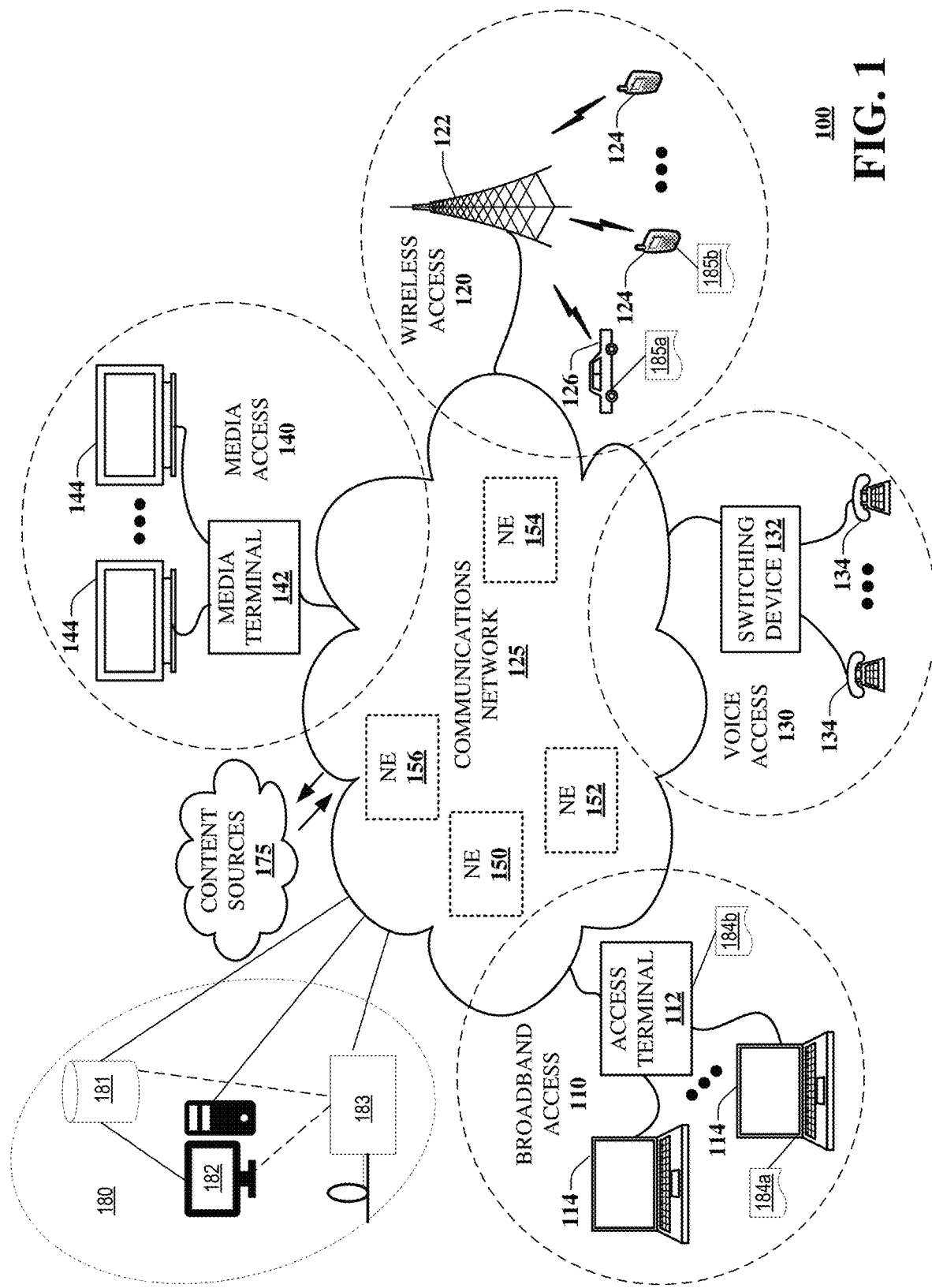
FIG. 1 is a block diagram illustrating an exemplary, non-limiting embodiment of a communications network in accordance with various aspects described herein.

The subject disclosure describes, among other things, illustrative embodiments for obtaining timing offsets for output ports of a multiport optical device having one input port and multiple output ports, obtaining an OTDR trace from the input port and distinguishing multipath traces from the multiple output ports according to the timing offsets. Other embodiments are described in the subject disclosure.

One or more aspects of the subject disclosure include an optical time-domain reflectometer (OTDR) device, including a processing system including a processor and a memory that stores executable instruction. The executable instructions, when executed by the processing system, facilitate performance of operations that include determining a number of distinct timing offsets between an input port and each output port of a number of output ports of a multiport optical device to obtain a determined number of distinct timing offsets. A light-wave source signal is injected at an input port of the multiport optical device to obtain a number of optical output signals at the number of output ports, wherein each optical output signal of the number of optical output signals includes a respective portion of the light-wave source signal delayed by a respective timing offset of the number of distinct timing offsets, and wherein the number of optical output signals are injected into a number of downstream optical fibers. An optical multipath return signal is received via the input port of the multiport optical device, wherein the optical multipath return signal includes a combination of a number of reflections, backscatter, or both, from the number of output optical signals injected into the number of downstream optical fibers. A number of expected reflections, backscatter, or both in the number of downstream optical fibers is calculated to obtain an expected multipath signature based on configuration data to obtain expected results. Results of the optical multipath return signal are compared to the expected multipath signature to obtain first comparison results and one of the reflections, backscatter or both is distinguished from the number of reflections, backscatter or both based on the first comparison results and the determined number of distinct timing offsets.

One or more aspects of the subject disclosure include a non-transitory, machine-readable medium, comprising executable instructions that, when executed by a processing system of an optical time-domain reflectometer (OTDR) including a processor, facilitate performance of operations. The operations include determining a number of distinct timing offsets between an input port and each output port of a number of output ports of a multiport optical device to obtain a determined number of distinct timing offsets. The operations further include injecting a light-wave source signal into the input port of the multiport optical device to obtain a number of optical output signals at the number of output ports, wherein each optical output signal of the number of optical output signals includes a respective portion of the light-wave source signal delayed by a respective timing offset of the number of distinct timing offsets, and wherein the number of optical output signals are injected into a number of downstream optical fibers. An optical multipath return signal is received via the input port of the multiport optical device, wherein the optical multipath return signal includes a combination of a number of reflections, backscatter, or both, from the number of output optical signals injected into the number of downstream optical fibers. A number of expected reflections, backscatter or both are estimated in the number of downstream optical fibers to obtain an expected multipath signature based on configuration data to obtain expected results, and one of the reflections, backscatter, or both from the number of reflections, backscatter or both is distinguished based on a comparison of the optical multipath return signal and the expected multipath signature.

One or more aspects of the subject disclosure include a process that includes determining, by a processing system including a processor of an optical time-domain reflectometer (OTDR), a number of distinct timing offsets between an input port and each output port of a number of output ports of a multiport optical device to obtain a determined number of distinct timing offsets. The process further includes directing, by the processing system, a light-wave source signal toward the input port of the multiport optical device to obtain a number of optical output signals at the number of output ports, wherein each optical output signal of the number of optical output signals includes a respective portion of the light-wave source signal delayed by a respective timing offset of the number of distinct timing offsets, and wherein the number of optical output signals are injected into a number of downstream optical fibers. An optical multipath return signal is obtained, by the processing system, via the input port of the multiport optical device, wherein the optical multipath return signal includes a combination of a number of reflections, backscatter, or both, from the number of output optical signals injected into the number of downstream optical fibers. A number of expected reflections, backscatter or both are estimated, by the processing system, in the number of downstream optical fibers to obtain an expected multipath signature based on configuration data to obtain expected results. One of the reflections, backscatter, or both from the number of reflections, backscatter or both are distinguished, by the processing system, based on a comparison of the optical multipath return signal and the expected multipath signature.

Referring now to FIG. 1, a block diagram is shown illustrating an example, non-limiting embodiment of a system 100 in accordance with various aspects described herein. For example, system 100 can facilitate in whole or in part obtaining fixed timing offsets for output ports of a multiport optical device having one input port and multiple output ports, obtaining an OTDR trace from the input port and distinguishing multipath traces from the multiple output ports according to the timing offsets. The multipath OTDR may implement an algorithm that calculates expected OTDR trace events based on known device parameters and locations. The calculated results may be compared to multipath OTDR results to confirm known events and/or to identify unexpected results, e.g., from a fiber break. A fiber break on one port will typically result in an unexpected reflection and/or attenuation which would be observable in the actual multipath OTDR results. A further comparison of the actual multipath OTDR trace to the calculated or estimated trace may identify other expected trace results, or events. However, in the example situation in which a fiber break occurs on one port, the expected fiber end event for that port would be altered, and perhaps nonexistent. Consequently, the algorithm may determine a cable break at a distance corresponding to the observed event and on an output port determined by an altered or missing result.

In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets, or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway, or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

The example system 100 includes a multipath OTDR application 184a, 184b, generally 184, that may be provided on broadband access equipment, such as the data terminal 114 and/or the access terminal. Alternatively or in addition, a multipath OTDR application 185a, 185b, generally 185, may be provided on mobile devices 124 and/or vehicles 126. The multipath OTDR applications may include one or more of a user interface adapted to accept user selections as may relate to test preferences, and/or output results, and/or relevant configuration information. The multipath OTDR applications 184, 185 may operate in conjunction with a traditional OTDR 183 positioned at a centralized location, such as a central office 180. Communication between the applications 184, 185 may be accomplished via one or more of the wireless access 120, the broadband access 110, and/or the communication network 125.

In at least some embodiments, the system 100 includes a local controller 182 proximal to the traditional OTDR device 183 and adapted to implement the appropriate functionality disclosed herein to interpret and in at least some instances distinguish multipath results. For example, the local controller 182 may provide a user interface and have access to local storage 181, remote storage (not shown), or both for storing one or more of configuration information, trace results, and the like.

Figure 2A:
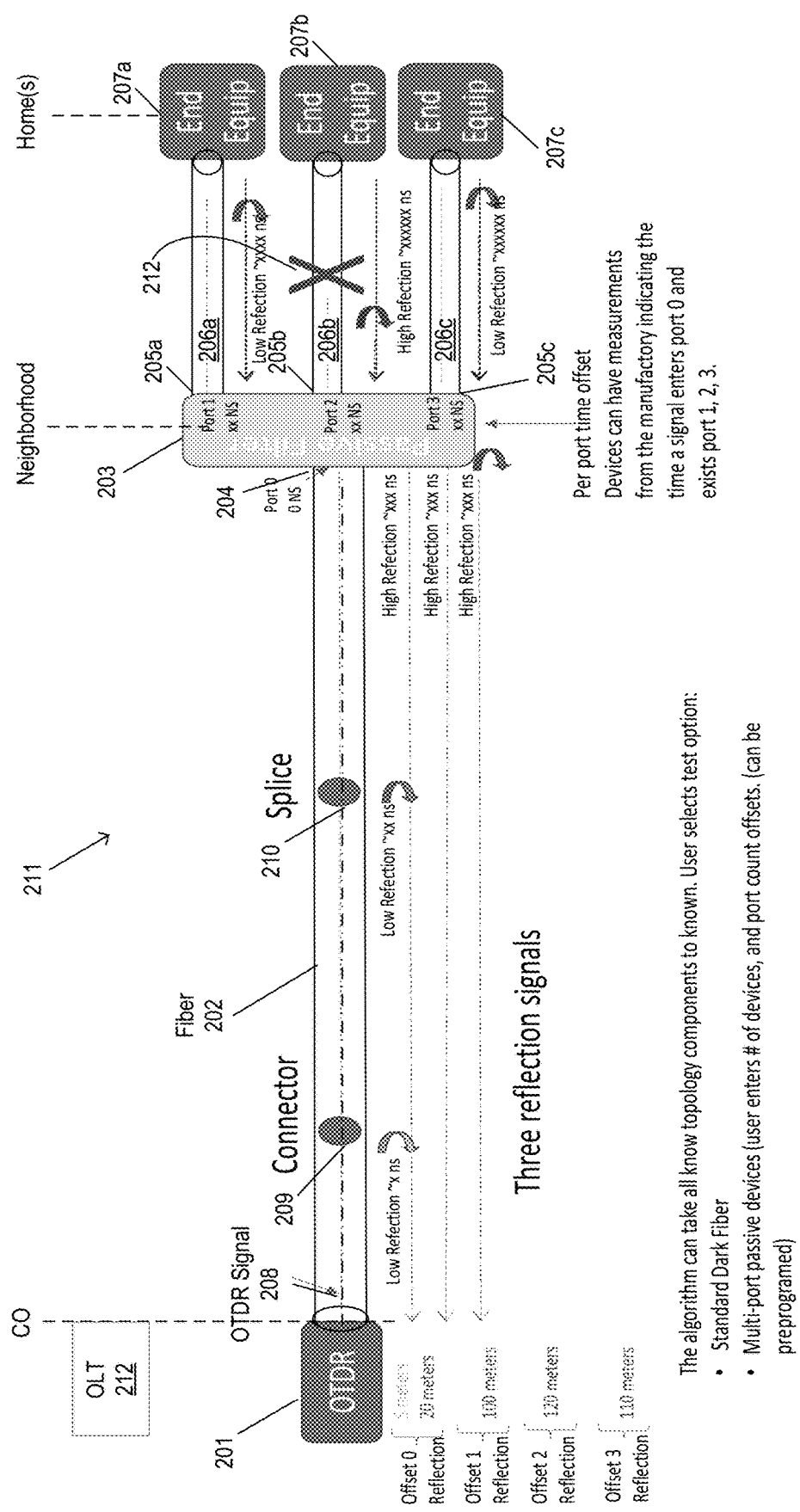
FIG. 2A is a block diagram illustrating an example, non-limiting embodiment of a multi-path OTDR system functioning within the communication network of FIG. 1 in accordance with various aspects described herein.

FIG. 2A is a block diagram illustrating an example, non-limiting embodiment of a multi-path OTDR system 200 functioning within the communication network of FIG. 1 in accordance with various aspects described herein. For example, a passive optical network 211 may extend from terminal equipment at a network service provider central office (CO) to residential terminal equipment at each of a group of subscriber homes and/or businesses. According to a typical fiber-to-the-home configuration, the passive optical network (PON) 211 includes a first optical fiber 202 that extends from the CO to a neighborhood location, e.g., typically within a last mile or so of each of the subscriber homes serviced by that cable. Since a distance between the CO and the neighborhood may be substantial, the first optical fiber 202 may extend for several miles or more. The example length is 10 km, or about 6 miles. It is also not uncommon for the first optical fiber 202 to include one or more connectors 209 and/or splices 210 linking together different fiber segments of the first optical fiber 202. Without limitation, the first optical fiber 202 may be a single mode fiber, a multimode fiber, a multi-fiber cables in which one or more of the cable fibers are single mode and/or multimode, or any combination thereof.

A proximal end of the first optical fiber 202 of the passive optical network 211 may terminate at service provider equipment at the CO, sometimes referred to as an optical line termination (OLT) or optical line terminal. The OLT may include, without limitation, electromagnetic sources, such as lasers, laser diodes, photodiodes, and the like. The electromagnetic sources may be adapted to convert electrical signals to light-wave signals, suitable for transmission over optical channels, such as optical waveguides, e.g., optical fibers. The light-wave sources may operate at one optical wavelength, or more than one optical wavelengths.

In at least some embodiments, more than one light-wave sources are coupled to the same optical fiber, such that multiple signals may propagate along a common length of fiber without interference. For example, the OLT may include an optical multiplexer adapted to share a common optical fiber channel according to one or more of time division multiplexing and/or wavelength division multiplexing. In at least some embodiments, the light-wave source may include multiple laser diodes, each operating at a different wavelength. A wavelength division multiplexer may be included at the CO end to combine the multiple optical signals at different wavelengths into a single, multi-wavelength signal. It is understood that another multiplexer, e.g., a de-multiplexer, may be employed at another point along the PON 211, e.g., at the neighborhood, and/or at one or more of the homes and/or businesses, and adapted to separate one or more of the multiplexed optical signals.

A PON may include one or more multiport optical devices, such as fiber optic filters, fiber optic power splitters, star couplers, and the like. According to the illustrative example, the PON 211 includes a 1:3 power splitter 203. The power splitter 203 has an optical input port 204 and three optical output ports 205a, 205b, 205c, generally 205. The power splitter 203 is adapted to divide an optical signal injected at the input port 204 into three substantially equal amplitude signals, providing a respective one of the divided optical signals as a respective output at each of the three output ports 205. The divided optical output signals output are coupled to proximal ends of three down-stream fiber optic cables, or residential fibers, 206a, 206b, 206c, generally 206. Distal ends of each of the residential fibers 206 terminate at respective end equipment 207a, 207b, 207c, generally 207, at different residences and/or businesses. The optical fiber termination equipment at a home is sometimes referred to as an optical network terminal (ONT). The end equipment, or ONTs 207 may include one or more of optical detectors, e.g., photodiodes, such as avalanche photodiodes, and/or light-wave sources, e.g., laser diodes. The electrooptical devices, e.g., the laser diodes and/or photodetectors, are adapted to transform electrical signals into corresponding optical signals, on the one hand, and from optical signals to corresponding electrical signals, on the other hand.

It is understood that the residential fibers 206 may have different lengths, e.g., depending upon differences in distances and/or cable routing paths from the power splitter 203 to the respective ONT 207. The example OTDR system 200 includes a OTDR 201 located at the CO. The OTDR 201 may be used to investigate performance of the PON 211. For example, the OTDR 201 may inject an optical signal 208 at the proximal end of the first optical fiber 202 and obtain measurements of any reflected and/or backscattered portions of the injected optical signal. It is understood that reflections and/or backscattering may result from physical features of the PON 211. For example, an optical fiber will backscatter some amount of the injected optical signal resulting in a return optical signal according to a physical property of the optical fiber. Likewise, a connector, a splice and/or an end of the optical fiber may introduce one or more of a reflection and/or an attenuation or loss.

The OTDR 201 is adapted to distinguish return optical signals, e.g., from reflections and/or backscatter, from the injected optical signal. In at least some embodiments, the injected optical signal includes a light-wave pulse having a pulse amplitude and a pulse width. Alternatively or in addition, the injected optical signal may include more than one pulse, e.g., a pulse train, or according to a pulse repetition rate. Consider the same relatively narrow pulse being injected periodically, at a period much greater than the pulse width. A time between the pulses may allow for a sensitive detector of the OTDR 201 to collect return signals. Based on the nature of transit time, a reflection of a particular OTDR pulse, e.g., from a connector or splice, will be received at the OTDR after a delay corresponding to a distance along the optical channel between the OTDR and the connector or splice. More particularly, the delay will correspond to twice the distance between the OTDR and the connector or splice, to account for round-trip propagation time.

As not all of the injected OTDR pulse may be reflected, another portion of the pulse continues to travel down the optical channel, away from the OTDR. Similar reflections may result from different connectors and/or splices, each being returned to the OTDR according to a different delay that corresponds to a round-trip distance to the other connectors and/or splices. As will be shown below, a return optical signal may be presented graphically along a time axis and/or a distance axis, in which the distance is determined according to the round-trip propagation delay in view of a waveguide velocity of the optical signal within the optical fiber, generally less than the speed of light in a vacuum, e.g., according to indexes of refraction of the optical fibers. Beneficially, the graphical result, sometimes referred to as an OTDR trace, provides a representation of a physical configuration of the PON 211, e.g., lengths of fibers, locations of connectors and/or splices, fiber attenuation, and the like.

It is further understood that a bend, a break, a stretch, or some other event may alter an optical property of the PON, e.g., of an affected optical fiber of the PON 211. Consider a situation in which a brake is introduced into one of the optical fibers 202, 206. In order to repair the PON 211, it is important to identify which optical fiber 202, 206 of the PON 211 was affected, and preferably, a distance at which the discontinuity is located along the fiber. For example, a break along the first optical fiber 202 will likely result in a substantial reflection and/or attenuation, apparent within the OTDR trace, at a delay or distance corresponding to a location of the break. Accordingly, it is possible to identify a break in the first fiber, which may be a buried fiber, and to determine a precise location of the break, such that maintenance personnel may be dispatched to the location in order to repair the break.

It is much more difficult, however, to use the OTDR 201 at the CO isolate and/or locate a similar break occurring within one of the residential fibers 206. The measurements are complicated by a multipath nature of return signals resulting from the multiple residential fibers 206. Namely, a return signal from the first residential fiber 206a is routed backwards, from the first output port to the input port 204 of the multiport optical device 203. Likewise, return signals from the second and third residential fibers 206b, 206c are routed backwards, from their respective second and third output ports 205b, 205c to the common input port 204, such that the OTDR 201 observes a combination of the three separate return signals within a single trace. The return signals from the individual residential fibers 206 may be summed and/or combined according to a superposition. To the extent a break in one of the residential fibers 206 occurred, a corresponding reflection may be observed at the OTDR 201, but a traditional OTDR 201 will not be able to distinguish from which residential cable the break occurred. Thus, it would be necessary to deploy maintenance personnel to conduct further OTDR measurements at a residential side of the multiport optical device 203. For example, the OTDR 201 may be moved to a proximal end of one of the residential fibers 206 to obtain a limited trace for that particular residential fiber. This process may be repeated for other residential fibers until the fiber having the break is measured.

Alternatively or in addition, the OTDR 201 may be positioned at one of the residences, e.g., in place of the end equipment 207. This would allow a trace to be obtained in an opposite direction, i.e., from the residence toward the CO. A trace obtained on an output port of the multiport optical device would not necessarily include signal from the other residential fibers 206 according to a nature of the multiport optical device. This reverse trace may be repeated from different residences until a trace is obtained from a residence served by the broken residential fiber 206, in which instance a reflection and/or loss due to the break would be evident in the OTDR trace. Unfortunately, any measurements performed outside of the CO will require deployment of maintenance personnel to the field.

Beneficially, the multipath OTDR and related techniques disclosed herein are adapted to locate events, e.g., reflections and/or losses, occurring at distal portions of the PON 211, after an output port of the multiport optical device 203. More precisely, the multipath OTDR 201, when operated from an input port side of the multiport optical device 203, e.g., at the CO, is adapted to detect trace events occurring on an output side of the multiport optical device and to associate the detected event with a corresponding output of the multiport optical device.

In at least some embodiments, per-port time offsets are identified for the output ports 205 of the multiport optical device 203. For example, each of the per-port time offset may correspond to a relative optical signal delay between the input port 204 and a respective one of the output ports 205. It us understood that due to design and/or manufacturing differences in any physical realization of the multiport optical device, there will be some degree of variance in per-port time offsets. In some embodiments, the per-port offsets may be provided by a supplier of the multiport optical device, e.g., according to a specification sheet and/or according to a per-device calibrated measurement as may be performed at a time of manufacture. Alternatively or in addition, the per-port time offset values may be measured by a fiber installer, e.g., at a time of installation. The resulting per-port offsets may be stored in a configuration record, e.g., database, associated with the PON 211.

Other application specific physical properties are known and/or determinable. For example, a length of the first optical fiber 202 may be measured at a time of installation using a traditional OTDR measurement. Likewise, lengths of the residential optical fibers 206 may be measured at a time of installation using a traditional OTDR measurement at the neighborhood and/or residential location. In some embodiments, the lengths of the residential fibers 206 may be determined before the fibers 206 are connected to the multiport optical device.

The International Telecommunications Union (ITU) and the Institute of Electrical and Electronics Engineers (IEEE) are two standards-making bodies currently developing PON standards. The ITU has adopted recommendations of the Full-Service Access Networks (FSAN) organization, including G983.x, a specification sometimes referred to as "broadband PON" (BPON), and G984.x, a specification sometimes referred to as "gigabit PON" (GPON). The IEEE has also adopted IEEE 802.3-based PON standards referred to as "Ethernet PON" (EPON) and "gigabit EPON" (GEPON). These standards and recommendations are well-known to persons skilled in the art to which the invention relates and are therefore not described in further detail in this patent specification ("herein").

Figure 2B:
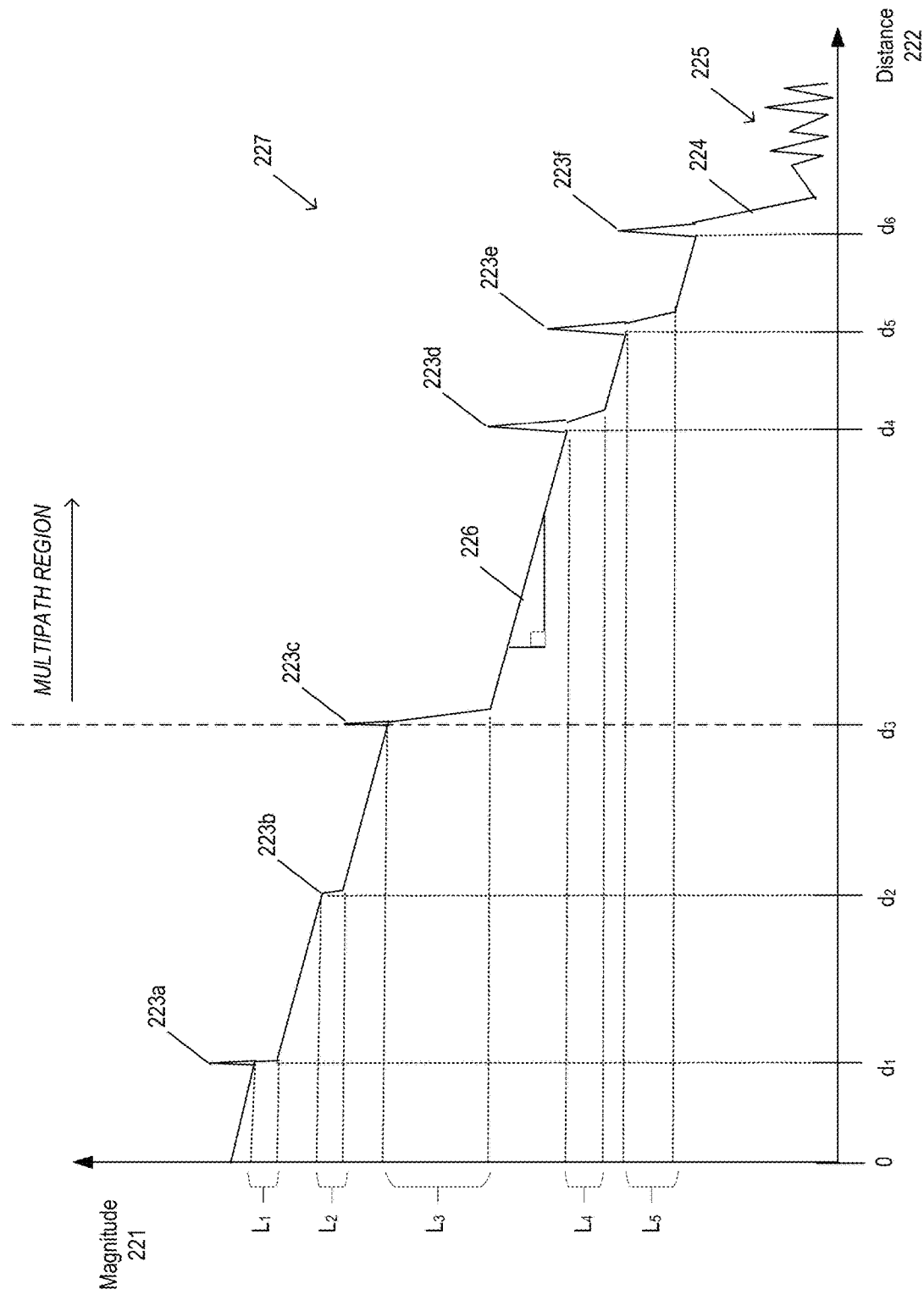
FIG. 2B is an OTDR results graph illustrating an example, non-limiting embodiment of an OTDR return trace obtained using a multi-path OTDR system functioning within the communication network of FIG. 1, the multipath OTDR system of FIG. 2A, or the multi-path OTDR of FIG. 2B in accordance with various aspects described herein.

FIG. 2B is an OTDR results graph 220 illustrating an example, non-limiting embodiment of an OTDR trace 227 obtained using a multi-path OTDR system functioning within the communication network of FIG. 1, the multipath OTDR system of FIG. 2A, or the multi-path OTDR of FIG. 2B in accordance with various aspects described herein. The example OTDR trace 227 represents a graphical signature of an optical fiber network, e.g., PON 211 (FIG. 2A). The trace 227 indicates attenuation along a length of the optical fiber, which provides insight into the performance of the link components (cable, connectors, and splices) and the quality of an installation by examining non-uniformities in the OTDR trace 220.

The example trace 227 is presented as a graph with magnitude along a vertical axis 221 and time along a horizontal axis 222. The time axis 221 begins at about 0 seconds, representing an attachment or launch point of the OTDR 201 (FIG. 2A). The example trace includes signatures of a number of events $223a \ldots 223f$, generally 223. For example, the first event 223a occurs at a distance $d_1$ and corresponds to an optical fiber connector 209 (FIG. 2A). The first event 223a includes a raised portion, indicating an increased magnitude of the OTDR return signal, caused by a reflection at the connector 209. The first event 223a also includes a discontinuity represented by an attenuation or reduction in returned signal, also resulting from the connector 209. In this instance, the return signal is reduced by an amount $L_1$.

It is understood that the optical fiber cable itself will result in some value of attenuation along its distance. This may be due to backscattering, cladding loss, absorption, and the like. The cable attenuation, barring any disturbances, such as bends, kinks, or stretches, results in a negative slope 226 that is generally linear. Consequently, the trace 227 is a generally straight line, sloping downward with distance to represent a lesser magnitude, i.e., greater loss, with distance. The trace 227 includes a record of events 223, e.g., discontinuities in the trace, occurring at distances that correspond to a location of a cause of the discontinuity along the optical fiber network path. For example, a second continuity occurring at a distance $d_2 > d_1$, corresponds to an optical fiber splice 210 (FIG. 2A). The second event 223b includes a loss $L_2$, but any reflection is negligible, such that there is not corresponding reflection peak.

A third event 223c corresponds to a multiport optical device, such as an optical signal splitter or optical fiber power divider 203 (FIG. 2A). The third event 223c occurs at a distance $d_3$, corresponding to a location of the optical signal splitter 203 includes at least one reflection peak and a corresponding attenuation or loss $L_3$. Distances to the right of $d_3$ correspond to portions of the PON 211 extending from the output ports 205 (FIG. 2A) of the splitter 203. According to the illustrative example, there are three separate optical fibers 206 connected to the output ports 205 and extending toward residences, e.g., terminating at respective ONTs 207 (FIG. 2A).

In more detail, the OTDR signal is divided by the splitter 203, into separate divided portions, directed to each output port 205, and further directed along the respective separate optical fibers 206 coupled to the respective output ports 205. Each separate fiber will introduce a respective cable loss, i.e., slope, to an OTDR return signal, as well as further events as may be attributable to connectors, splices, cable ends, and the like. However, the return signals will necessarily pass through the splitter 203 in a reverse direction. Namely, separate return signals from each of the separate optical fibers 206 will enter into their respective output ports 205 and exit the splitter at its input port 204. As a consequence, the optical signals may be combined, e.g., summed together, resulting in a combined return signal for those portions of the PON 211 occurring distal to the splitter 203.

According to the illustrative example, a fourth event 223d, is represented in the trace 227 at a distance $d_4$, including a reflective peak and an attenuation $L_4$. Likewise, a fifth event 223e, is represented in the trace 227 at a distance $d_5$, including a reflective peak and an attenuation $L_5$ and a sixth event 223f, is represented a distance $d_5$, also including a reflective peak. According to the illustrative PON 211, the fourth, fifth and sixth events 223d, 223e, 223f correspond to fiber terminations at the ONTs 207. Unfortunately, as the return signals were combined upon their return through the splitter 203, in this instance acting as a signal combiner, e.g., a power combiner simply adding the signals together, it is not apparent as to which event 223d, 223e, 223f corresponds to which fiber 206. Consequently, if a fault were discovered and maintenance personnel dispatched, further investigation would be necessary in the field, e.g., performing subsequent OTDR measurements on the individual distal fiber links 206.

Beneficially, according to the techniques disclosed herein, it becomes possible to distinguish the trace returns according to different timing offsets introduced to each of the traces by the splitter 203. First, a first fiber distance $d_3$ between the OTDR and the splitter 203 is known at a time of the OTDR measurement. Likewise, individual lengths of the distal fibers 206 are also known at the time of the OTDR measurement, as are timing offsets of each of the individual output ports 205 of the splitter. Such information may be determined during installation, upgrade and/or maintenance of the PON 211. For example, installation and/or maintenance teams dispatched to the field for installation and/or maintenance may conduct supplemental OTDR measurements on the entire PON 211 and/or segments of the PON 211, such as the first optical fiber 202 and/or the distal optical fibers 206. Results, including cable lengths, may be stored and/or otherwise retained in PON configuration records. Similarly, the timing offsets of the output ports 205 of the splitter 203 may be measured and/or otherwise determined according to specification sheets, calibration records, manufacturing records, and the like.

An algorithm may be supplied with one or more of the cable lengths, and the timing offsets of the splitter. In at least some embodiments, the algorithm calculates anticipated events based on predetermined lengths. A first length may be from the CO to a first residence, a second length from the CO to a second residence, and so on. It is anticipated that most if not all residences will be serviced by different length cable runs from the splitter 203 to the ONTs 207. This should prevent any overlapping of events within the trace 227 that are attributable to cable ends as the ends are at different distances.

According to an embodiment of the algorithm, estimates of expected events, e.g., cable loss, connector and/or splice events, and cable ends may be calculated beforehand to determine an estimated trace 227 and/or an estimated distance to one or more expected events. The results may be compared with actual OTDR measurements, e.g., obtained from a CO end of the PON 211. As the calculations have not yet accounted for timing offsets of the multiport optical device, e.g., the splitter 203, there will be offsets between calculated distances of expected events and the measured distances of the actual events. In at least some scenarios, the difference may be attributable to the timing offsets. In at least some embodiments an error or offset may be determined as a difference between an expected event and a measured event. The error or offset may be determined as a distance value, e.g., $\Delta d$, or a time value $\Delta t$. To the extend distance offsets are determined, they may be converted to corresponding timing offsets, e.g., dividing the distance offset by a speed of light in the fiber to determine a corresponding timing offset. The timing offsets may be compared to predetermined different timing offsets of the splitter. To the extent a timing offset corresponding to the calculated error of one of the events agrees with a timing offset of a particular port of the splitter 203, it may be concluded that the residence at a predetermined distance from the splitter is connected to a particular port.

It is understood that in at least some configurations, the timing offsets of the splitter 203 may be relatively small, e.g., on the order of 1 nanosecond, or less. In at least some embodiments, the OTDR 201 may be adjusted to inject light pulses of a suitably narrow pulse width to distinguish among the timing offsets of the splitter 203. In at least some embodiments, the narrow pulses are repeated according to a pulse repetition rate and return signals from multiple pulses combined in a post processing step. For example, return pulses may be averaged, e.g., over some predetermined number of pulses. Alternatively or in addition, pulse returns may be applied to a max function, such that a record of peak returns is obtained. In at least some embodiments, the return pulses may be combined in an incoherent manner and/or in a coherent manner, e.g., to increase sensitivity of the OTDR measurement. Although narrow pulses may be beneficial to distinguish relatively small offsets, larger pulses, e.g., having wider pulse widths, may be used to increase sensitivity over greater cable lengths. In at least some embodiments, combinations of short and long pulses may be injected by the OTDR 201, e.g., independently during successive measurements, or according to a varied repetitive pulse train of relative narrow and relative wide pulses.

Figure 2C:
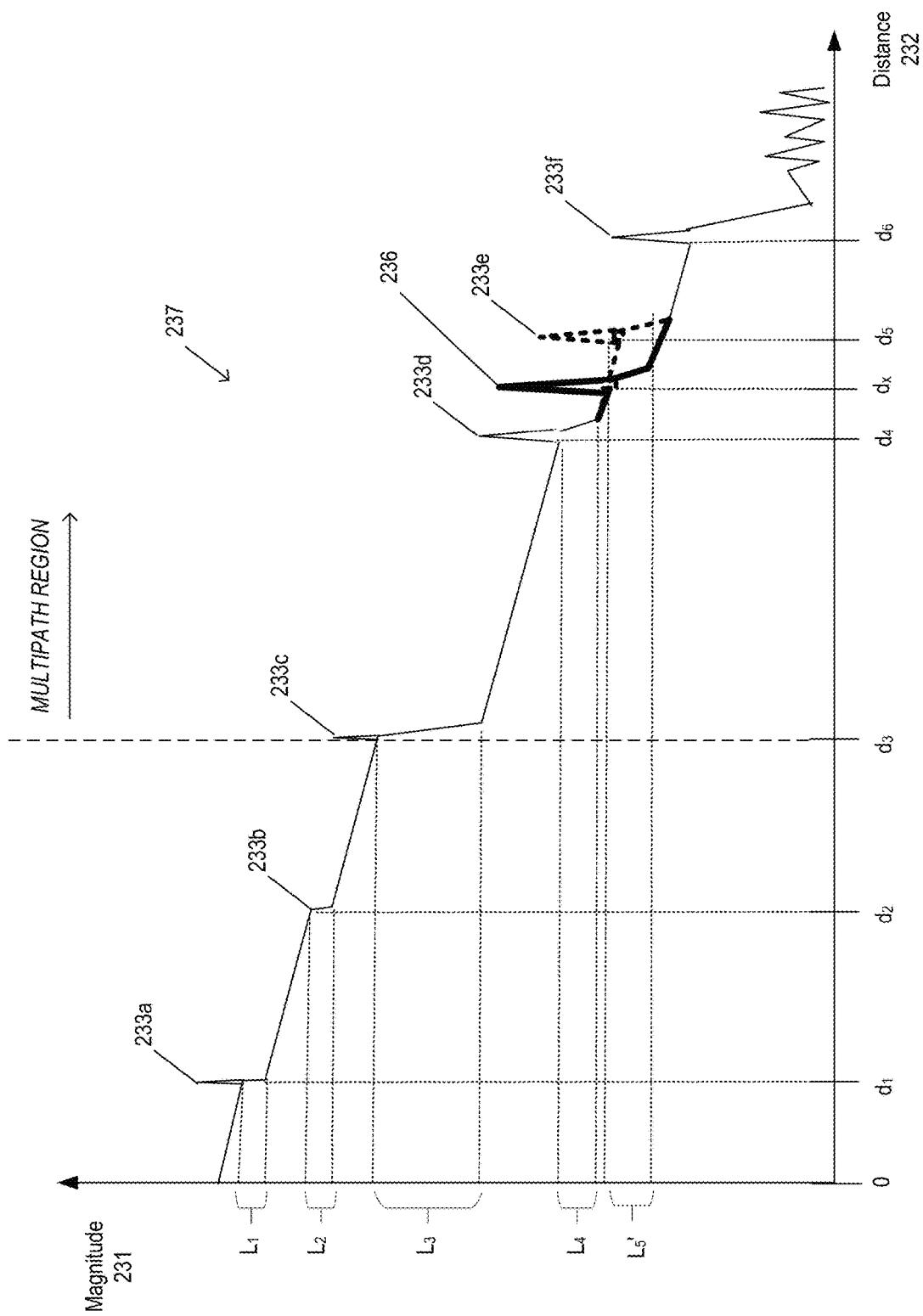
FIG. 2C is an OTDR results graph illustrating an example, non-limiting embodiment of another OTDR return trace obtained using a multi-path OTDR system functioning within the communication network of FIG. 1, the multipath OTDR system of FIG. 2A, or the multi-path OTDR of FIG. 2B in accordance with various aspects described herein.

FIG. 2C is an OTDR results graph 230 graph illustrating an example, non-limiting embodiment of another OTDR trace obtained using the multi-path OTDR system functioning within the communication network of FIG. 1, the multipath OTDR system 200 of FIG. 2A in accordance with various aspects described herein. The example trace 237 is presented as a graph with magnitude along a vertical axis 231 and time along a horizontal axis 232. In particular, the trace 237 represents a trace obtained from the same PON 211, to permit a comparison to the initial trace 227 (FIG. 2B) obtained during normal operating conditions, e.g., at a time of installation and/or reconfiguration. Any changes to the PON 211 that may result from breaks, bends, stretches and/or configuration changes, are observable as differences between the initial trace 227 and the example subsequent trace 237.

As expected, the example subsequent trace 237 includes signatures of a number of events $233a \ldots 233f$, generally 233, corresponding to those events 223 observed in the initial trace. Most of the events 233 line up with the initial events 223. However, the example trace 237 does include at least one difference. Namely, a new discontinuity 236 is observable at a distance $d_x$, with $d_4 < d_x < d_5$. Additionally, a formerly observed fifth continuity 233e, shown in phantom, does not appear in the subsequent trace 237. An OTDR algorithm may detect the new discontinuity 236, also noting a change in a formerly observed fifth event 233e. In an effort to locate a cause of the new event 236 and/or at least distinguish which residential fiber 206 may be involved, the algorithm may be adapted to rule out certain branches of the multipath portion and/or analysis. For example, the algorithm may perform comparisons, e.g., by comparing a distance of the unexpected event $d_x$ to distances of other observed events, the algorithm may rule out some paths 206. For example, by observing that $d_x$ is greater than $d_4$, the algorithm may conclude that a cause of the event does not involve the first residential fiber 206a associated with distance $d_4$. According to further analysis, the algorithm may conclude that the newly observed event 236 is not associated with the third residential fiber 206c, within which a seventh event 226g occurring at $d_7$. According to the illustrative example, the current seventh event 233f substantially lines up with a previously observed seventh event 223f observed during the initial trace at $d_7$. In at least some embodiments, such a conclusion may be made without necessarily comparing a magnitude and/or loss of the seventh event 230f. The process may continue comparing event by event in both traces 227, 237, ruling out likely candidate fibers and/or splitter ports and arriving at a most likely candidate fiber 206b and/or port 205b by a process of elimination. Having previously determined a residential port fiber 206 to splitter port 205 association, the algorithm may conclude which fiber 206 and/or port 205 requires further investigation and/or maintenance. Accordingly, a maintenance team may be deployed to a precise fiber and in at least some instances, to a precise location along the fiber, e.g., determinable according to distance dx, to investigate and/or correct any anomaly. The trace 227 includes an indication of an end of the fiber 244, followed by noise 255.

Figure 2D:
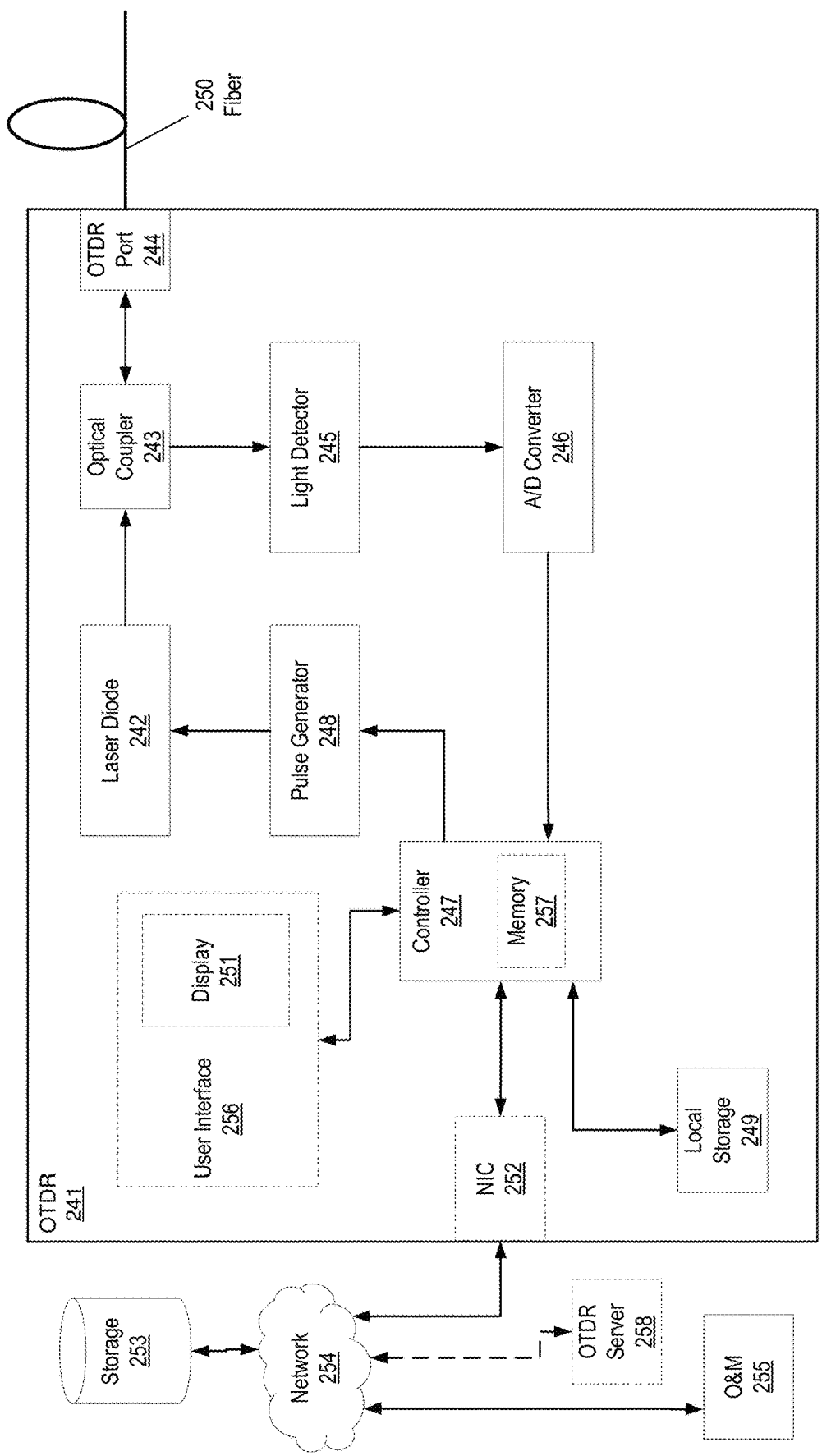
FIG. 2D is a block diagram illustrating an example, non-limiting embodiment of a multi-path OTDR functioning within the communication network of FIG. 1 and the multi-path OTDR system of FIG. 2A in accordance with various aspects described herein.

FIG. 2D is a block diagram illustrating an example, non-limiting embodiment of a multi-path OTDR system 240 functioning within the communication network of FIG. 1 and the multi-path OTDR system of FIG. 2A in accordance with various aspects described herein. The system 240 includes a multipath OTDR device 241 adapted to inject optical signals, e.g., pulses, into fibers and/or fiber networks, e.g., the PON 211 (FIG. 2A) and to determine traces and/or signatures based upon measured returned light resulting from the injected signal.

According to the illustrative example, the OTDR device 241 includes a laser diode 242, a light detector 245, and an optical coupler 243. The laser diode 242 and the light detector 245 are each coupled via an OTDR port 244 to one end of an optical fiber 250, e.g., a first fiber 202 of the PON 211. The OTDR device 241 further includes a pulse generator 248, an analog-to-digital (A/D) converter 246 and a controller 247. The controller 247 may be adapted to control the pulse generator to generate one or more electrical pulses, e.g., having one or more of a predetermine pulse width, pulse widths and/or pulse repetition rate(s). The electrical pulses, in turn, are applied to the laser diode 242, causing the laser diode to emit light pulses according to the pulse width(s) and/or pulse repetition rates. The light pulses are directed toward the optical coupler 243, which directs the pulses toward the OTDR port 244, allowing the light pulses to be injected into the optical fiber 250.

It is understood that injected optical pulses will result in a return signal based on reflections and/or backscattering of the injected pulses. The return signal may include reflections from intended discontinuities along fibers, e.g., due to connectors, splices and/or cable ends. Other causes may be due to unintended discontinuities, such as bends, stretches and/or breaks in one or more of the optical fibers. The light detector 245 is coupled to the same end of the optical fiber 250, allowing a return signal to be coupled to the light detector 245 via the same OTDR port 244 and the optical coupler 243. The light detector may include any suitable electrooptic device, such as a photodiode detector, e.g., an avalanche photodiode detector. It is understood that although the return signal resulted from an injected light pulse, the return signal will be continuous in nature, i.e., an analog signal. In at least some embodiments, e.g., to facilitate digital processing and/or computer-controlled algorithms, the return signal is converted to a digital representation via the A/D converter 246. The resulting digitized return signal may be provided to the controller 247.

In at least some embodiments, the OTDR device 241 may include a user interface 256. The user interface may be in communication with the controller 247, allowing a user to operate and/or otherwise control one or more features of the OTDR device 241. For example, the user interface 256 may include one or more of a touch screen, a pointing device, such as a mouse or trackball, a keyboard, a joystick, and so on. In at least some embodiments, the OTDR device 241 includes at least one display device 251. According to the illustrative example, the display device 251 is included within the user interface 256. For example, the user interface may be a graphical user interface allowing a user to select OTDR measurements and/or tests, to enter data, such as PON configurations, cable types, cable lengths, connector and/or splice types and/or locations, multiport optical device, e.g., splitter, types, configurations, e.g., split ratios, numbers of ports, whether ports are terminated or not, and so on.

In at least some embodiments, the OTDR device 241 includes local storage 249. Local storage 249 may be used to retain one or more of PON configuration parameters, device configurations and/or parameters, historical records of prior measurements, e.g., OTDR traces and/or fault location analyses as may have been determined according to the algorithm. The controller 247 may include memory 257 adapted to store pre-programmed, machine-readable instructions adapted to operate the OTDR device 241, e.g., to configure injection pulses, to interpret return signals and to prepare traces. In at least some embodiments, the memory 257 may store instructions adapted to implement algorithms, such as one or more of the example algorithms disclosed herein, adapted to interpret multipath results. Such interpretations may include one or more of associating multipath events with one or more ports of a multipath optical device and/or locating faults that may result in unintended events in a resulting OTDR trace. Such fault identification preferably includes identification as to which fiber of a multipath fiber segment the event may be attributable to. Alternatively or in addition, fault identification may include a location, e.g., a length or distance from a reference point, such as a residence and/or a multipath optical device.

In at least some embodiments, the OTDR system 240 may include a remote storage repository 253, such as cloud storage and/or a database system. The OTDR device 241 may include a network interface, e.g., a network interface card 252, providing access to remote resources, such as the remote storage system 253 and/or a remote operation and maintenance (O&M) system or terminal 255 via a network 254. The network 254 may include, without limitation, one or more of an Ethernet network, a broadband network such as the Internet, a wireless network, such as Bluetooth, WiFi and/or mobile cellular network.

It is envisioned that in at least some embodiments, the OTDR device 241 may be accessed via the remote O&M system 255. Such remote access may permit one or more of entering system configuration data, such as cable lengths, types, etc., initiating OTDR measurement and analysis of OTDR traces. In at least some embodiments, the O&M system 255 may be adapted to conduct multipath analyses, e.g., to associate observable events with particular multipath cables and/or ports of a multiport optical device.

It is further envisioned that in at least some embodiments, at least some of the functionality of the OTDR device 241 may be controlled from a remote OTDR application hosted on a remote, e.g., a backend, server 258. For example, the OTDR device 241 and/or at least some algorithms, such as the multipath algorithms, may be implemented via an app and/or according to a client-server model. In at least some embodiments, the multipath app may be applied to traces obtained via a traditional OTDR. The multipath app may accept configuration data, such as per-port timing offsets that may not have been available or provided during the initial trace. The per-port timing offsets may be used in a calculation involving the earlier traditional OTDR trace to allow events to be distinguished and/or otherwise associated with a particular splitter port.

Figure 2E:
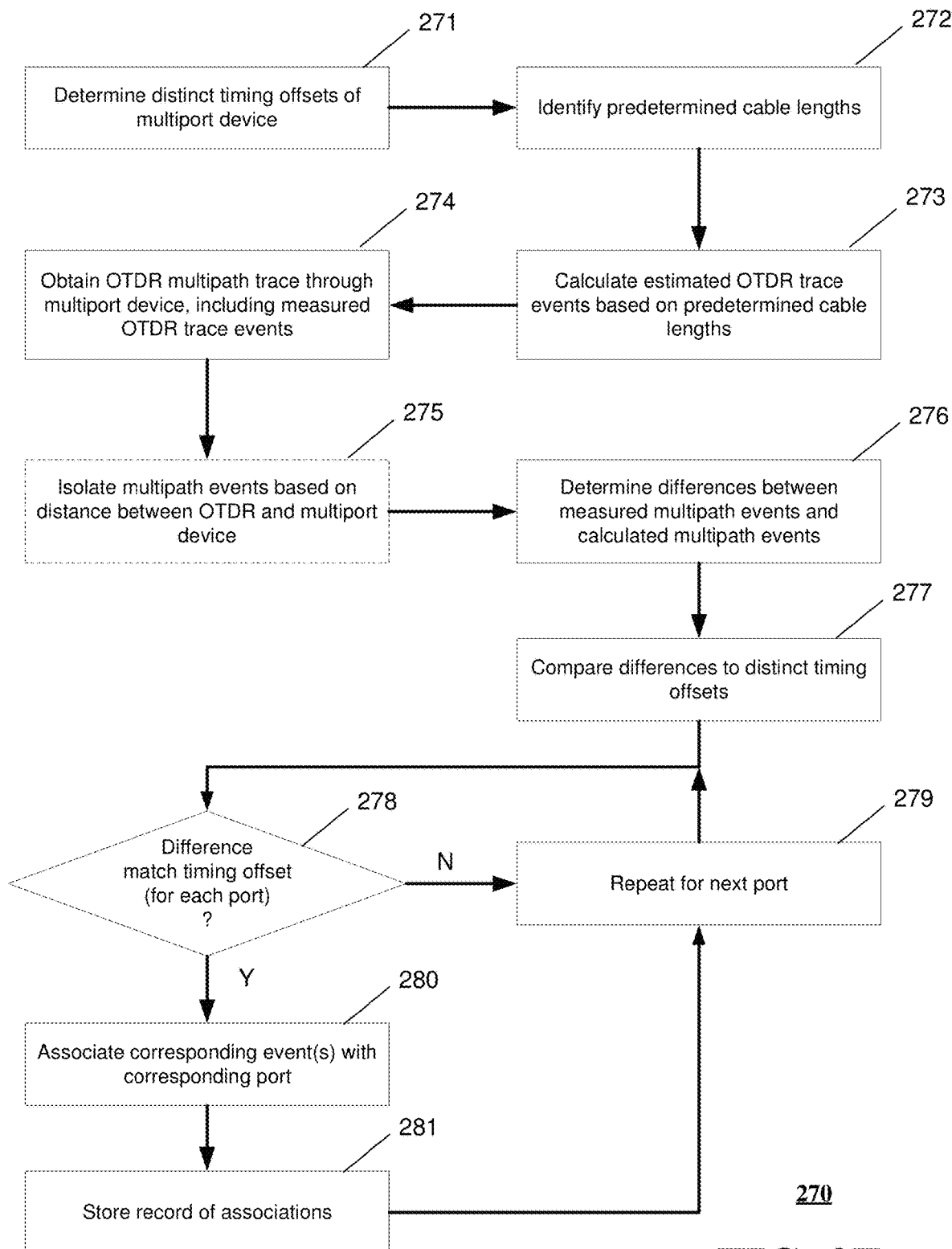
FIG. 2E depicts an illustrative embodiment of a multipath OTDR process in accordance with various aspects described herein.

FIG. 2E depicts an illustrative embodiment of a multipath OTDR process 270 in accordance with various aspects described herein. The OTDR process 270, when applied to a multipath system in which an OTDR signal is injected into one port, e.g., and input port of a multiport device, such as a signal splitter, results in an OTDR trace that includes a combined, e.g., an overlapping trace portion based on those portions of a PON coupled to multiple output ports of the multiport device. In particular, trace events observable in the multipath portion of the trace may be distinguished based on different timing offsets for each output port of the multiport device. Consider a 1:8 optical splitter in which an OTDR signal injected at the input port is divided into 8 signal portions, each signal portion directed towards portions of the PON downstream with respect to the splitter. According to the illustrative example, up to 8 individual return signals obtained from each of the 8 downstream PON segments may be combined upon their return trip through the splitter. Namely, up to 8 independent return signal portions responsive to the 8 downstream signal portions, are summed into a combined signal exiting the input port of the splitter on its way back to a detector of the OTDR.

Since each of the 8 ports of the 1:8 splitter has a corresponding unique timing offset $\Delta t_1, \ldots, \Delta t_8$, generally $\Delta t$, each injected signal portion will be delayed by a corresponding $\Delta t$. Likewise, upon their return journey back to the OTDR any reflections and/or backscatter from the downstream PON segments will once again be delayed by the same corresponding timing offset $\Delta t$. The timing offsets may be converted to a corresponding distance displacement, $\Delta d_1, \ldots, \Delta d_8$, generally $\Delta_d$. It is understood that a multipath OTDR trace obtained through a multiport device having unique port timing offsets, will result in a trace in which events occurring within the multipath portion of the trace will also be offset by a corresponding distance $\Delta d$. As the timing offsets may be predetermined and associated with particular ports, it is possible to associate multipath events with a particular multiport device output port, or similarly with an associated downstream PON segment. Such techniques that consider the per-port timing offsets facilitate operation and maintenance of a multipath system, using a single OTDR from an upstream perspective, e.g., at a CO, to obtain a multipath trace through one end of a single fiber. In at least some embodiments, events within a multipath portion of the trace may be distinguished using a single pulse, or a uniform pulse train at one end of a single fiber.

According to the example process 270, distinct timing offsets of multiport device are determined at 271. The distinct timing offsets may be obtained by identification of a particular multiport device. For example, a model xyz splitter may be provided with a corresponding specification sheet that includes timing offset values for each port. The timing offsets may be substantially uniform from device to device, but unique to each port according to internal design of the multiport device. Alternatively or in addition, a model xyz splitter, having serial no. abc, may be provided with a corresponding specification sheet that includes timing offset values determined for that particular device and/or lot of devices. For example, the timing offset values may be determined at a time of manufacture, e.g., curing a characterization or performance test and/or calibration procedure. Alternatively or in addition, the timing offset values may be measured by an optical network installer and/or maintainer. For example, the timing offsets may be measured directly, e.g., according to two-port measurements in which a signal is injected at an input and measured at an output, a timing difference between the two signals corresponding to the timing offset for that particular port.

In at least some embodiments, the process 270 includes identifying predetermined cable lengths at 272. Cable lengths can be identified for cables connected along an upstream portion of the PON, e.g., between an input port of the multiport device and a location of the OTDR. Likewise, cable lengths can be identified for cables connected along a downstream portion of the PON, e.g., between output ports of the multiport device and downstream terminations, e.g., residence ONTs. The precise lengths of the PON optical fibers may be determined upon installation and/or during field maintenance using standard techniques, including traditional OTDR measurements in which distances may be determined from trace results that identify cable ends.

In at least some embodiments, OTDR trace events may be estimated, e.g., by calculation rather than measurement, based identification of the predetermined cable lengths at 273. For example, an estimated trace may be prepared based on distance/delay calculations in known cable types, operating at known wavelengths, and over predetermined distances. Events may include one or more of cable ends, connectors, splices, and/or cable attenuation. It is worth noting that although optical fiber attenuation is generally shown and described as a sloping line in the example traces provided herein, it is possible to disregard such cable loss, in at least some trace results, to facilitate comparison of results, such as reflections and/or attenuation or losses due to discontinuities, rather than due to the optical fiber itself. Resulting traces would be relatively straight, horizontal lines, with reflective spiles and horizontal offsets as may result from losses within the PON. In at least some embodiments, the estimated OTDR trace may consider timing offsets of the multiport device. This may require beforehand knowledge as to which port any downstream portion of the PON is attached, such that the correct timing offset may be applied. Alternatively, the estimated OTDR trace may be calculated or otherwise generated without regard to the timing offset values.

An OTDR multipath trace is obtained through the multiport device at 274. The multipath trace displays measured OTDR trace events, including any events occurring within a multipath portion of the trace, i.e., along portions of the PON downstream from a multiport optical device, such as a 1:N splitter. The measured OTDR multipath trace may be compared to an estimated or calculated trace based on predetermined device types and locations, including the distinct multiport device timing offsets. In at least some embodiments, events may be isolated or otherwise characterized as multipath events according to a distance along the fiber as at 275. For example, the distance of the event occurring after a known distance of an optical splitter would allow the event to be associated with a multipath segment of the PON. Differences may be determined between measured multipath events and calculated multipath events at 276.

The observable differences between the measured and calculated OTDR traces may be compared to distinct timing offsets at 277. The comparisons may be made on an event-by-event basis, in which a resulting difference for a particular event is compared to the predetermined timing offsets at 278. To the extent a difference of a particular event does not match at timing offset, the process 270 continues by comparing a difference of a next event is obtained at 279 and compared to predetermined timing offsets at 278. However, to the extent a difference of a particular event does match a timing offset of a particular port, the particular event may be associated with the corresponding port at 280. The timing offset to difference comparison presupposes that the estimated OTDR trace does not include timing offsets.

Alternatively or in addition, the timing offsets may be included in the estimated OTDR trace, such that estimated events are matched to observed events. To the extent that events do not match, the algorithm may compare timing offsets and recalculate the estimated event to an observed event to identify wither a port may have been misidentified. In such instances, calculations may be performed according to the timing offsets of the other ports to identify which ports may have been misidentified, and/or what the correct port should be.

The process 270 may continue at 279, e.g., obtaining a timing offset for a next port at 279 and repeat the timing difference matching at 277, until all calculated and/or observed multipath events have been evaluated, e.g., compared to timing offsets of all available ports of the multiport optical device. According to the example process 270, a record of the port to distal PON segment associations may be stored at 281.

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In at least some embodiments, the multipath OTDR is adapted to modify a multipath trace, by separately presenting trace segments of the different multipath portions. For example, a first portion of a multipath trace between the OTDR and a multiport optical component may be presented as a traditional trace. However, multiple traces, e.g., one for each different port of a multiport device, may be presented for portions of the OTDR trace occurring after the multiport optical device. In at least some embodiments, the separated multipath traces may be presented in a vertical offset within the same graph. Alternatively or in addition, multiple graphs may be presented, e.g., one for each path. The multiple graphs may be complete from the OTDR source to the particular multipath distal end, or the graphs may be presented in a split or multi-window manner, e.g., with one common proximal PON portion and multiple distal multipath portions, one for each of the different outputs. Such separation of the distal portions may be performed after having associated events within the multipath portion with particular output ports of the multiport optical device.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of system 200, 240 and process 270 presented in FIGS. 1, 2A, 2D and 3. For example, virtualized communication network 300 can facilitate in whole or in part obtaining fixed timing offsets for output ports of a multiport optical device having one input port and multiple output ports, obtaining an OTDR trace from the input port and distinguishing multipath traces from the multiple output ports according to the timing offsets. The multipath OTDR may implement an algorithm that calculates expected OTDR trace events based on known device parameters and locations. The calculated results may be compared to multipath OTDR results to confirm known events and/or to identify unexpected results, e.g., from a fiber break. A fiber break on one port will typically result in an unexpected reflection and/or attenuation which would be observable in the actual multipath OTDR results. A further comparison of the actual multipath OTDR trace to the calculated or estimated trace may identify other expected trace results, or events. However, in the example situation in which a fiber break occurs on one port, the expected fiber end event for that port would be altered, and perhaps nonexistent. Consequently, the algorithm may determine a cable break at a distance corresponding to the observed event and on an output port determined by an altered or missing result.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers, and other network elements. Because these elements do not typically need to forward large amounts of traffic, their workload can be distributed across a number of servers—each of which adds a portion of the capability, and overall which creates an elastic function with higher availability than its former monolithic version. These virtual network elements 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

The example communication network 300 includes a multipath OTDR application 384 that may be accessible via broadband access 110. Alternatively or in addition, a multipath OTDR application 385 may be provided on mobile devices and accessible via wireless access 120. The multipath OTDR applications 384, 385 may include one or more of a user interface adapted to accept user selections as may relate to test preferences, and/or output results, and/or relevant configuration information. The multipath OTDR applications 384, 385 may operate in conjunction with a traditional OTDR 383 positioned at a centralized location, such as a central office 380. Communication between the applications 384, 385 may be accomplished via one or more of the transport layer 350 and/or the virtualized network function cloud 325.

In at least some embodiments, the communication network 300 includes a local controller 382 proximal to the traditional OTDR device 383 and adapted to implement the appropriate functionality disclosed herein to interpret and in at least some instances distinguish multipath results. For example, the local controller 382 may provide a user interface and have access to local storage 381, remote storage (not shown), or both for storing one or more of configuration information, trace results, and the like.

Figure 4:
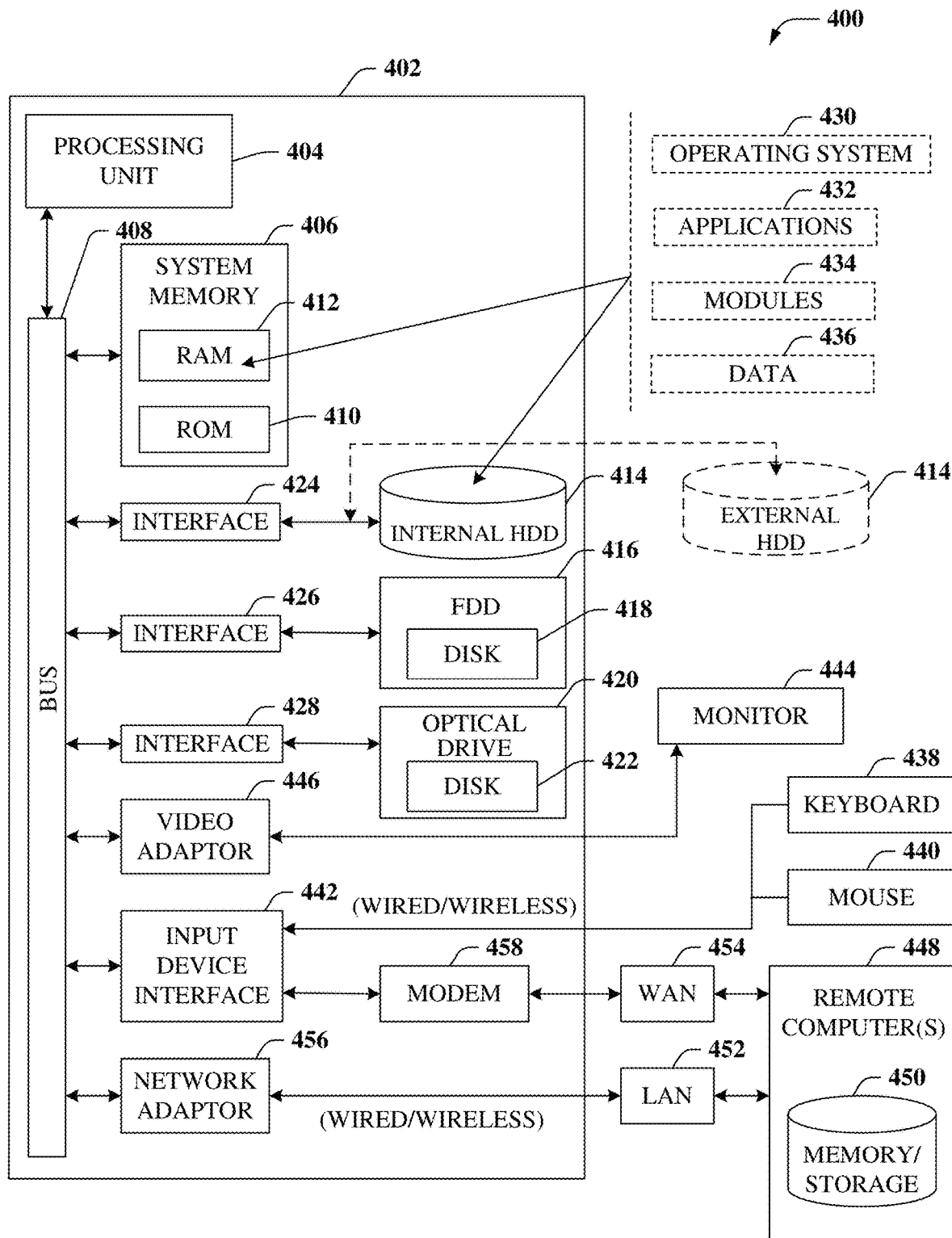
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part obtaining fixed timing offsets for output ports of a multiport optical device having one input port and multiple output ports, obtaining an OTDR trace from the input port and distinguishing multipath traces from the multiple output ports according to the timing offsets. The multipath OTDR may implement an algorithm that calculates expected OTDR trace events based on known device parameters and locations. The calculated results may be compared to multipath OTDR results to confirm known events and/or to identify unexpected results, e.g., from a fiber break. A fiber break on one port will typically result in an unexpected reflection and/or attenuation which would be observable in the actual multipath OTDR results. A further comparison of the actual multipath OTDR trace to the calculated or estimated trace may identify other expected trace results, or events. However, in the example situation in which a fiber break occurs on one port, the expected fiber end event for that port would be altered, and perhaps nonexistent. Consequently, the algorithm may determine a cable break at a distance corresponding to the observed event and on an output port determined by an altered or missing result.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
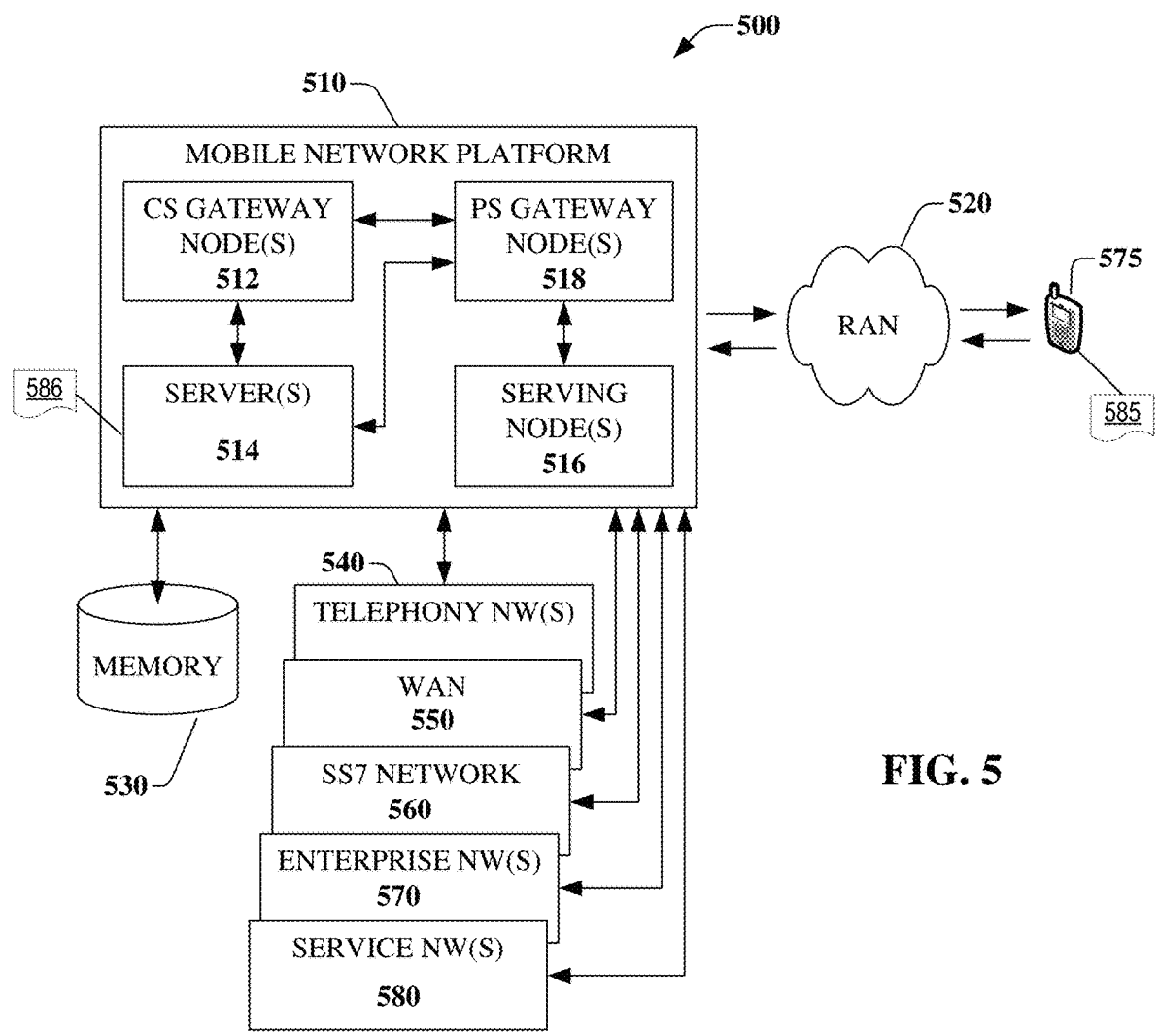
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part obtaining fixed timing offsets for output ports of a multiport optical device having one input port and multiple output ports, obtaining an OTDR trace from the input port and distinguishing multipath traces from the multiple output ports according to the timing offsets. The multipath OTDR may implement an algorithm that calculates expected OTDR trace events based on known device parameters and locations. The calculated results may be compared to multipath OTDR results to confirm known events and/or to identify unexpected results, e.g., from a fiber break. A fiber break on one port will typically result in an unexpected reflection and/or attenuation which would be observable in the actual multipath OTDR results. A further comparison of the actual multipath OTDR trace to the calculated or estimated trace may identify other expected trace results, or events. However, in the example situation in which a fiber break occurs on one port, the expected fiber end event for that port would be altered, and perhaps nonexistent. Consequently, the algorithm may determine a cable break at a distance corresponding to the observed event and on an output port determined by an altered or missing result.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

The example system 500 includes a multipath OTDR application 586 that may resident in one or more servers 514 of the mobile network platform 510. Alternatively or in addition, a multipath OTDR application 585 may be provided on mobile devices 575 and accessible via a RAN 520 120. The multipath OTDR applications 586, 585 may include one or more of a user interface adapted to accept user selections as may relate to test preferences, and/or output results, and/or relevant configuration information. The multipath OTDR applications 586, 585 may operate in conjunction with a traditional OTDR positioned at a centralized location, such as a central office. Communication between the applications 586, 585 may be accomplished via a mobile network.

Figure 6:
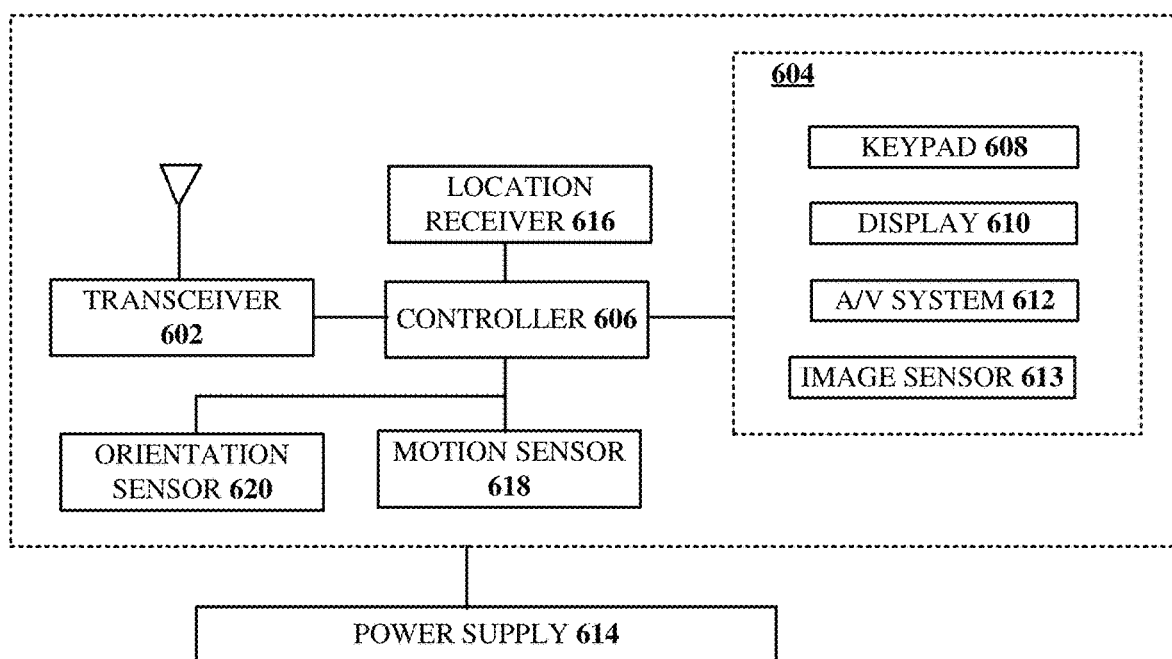
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part obtaining fixed timing offsets for output ports of a multiport optical device having one input port and multiple output ports, obtaining an OTDR trace from the input port and distinguishing multipath traces from the multiple output ports according to the timing offsets. The multipath OTDR may implement an algorithm that calculates expected OTDR trace events based on known device parameters and locations. The calculated results may be compared to multipath OTDR results to confirm known events and/or to identify unexpected results, e.g., from a fiber break. A fiber break on one port will typically result in an unexpected reflection and/or attenuation which would be observable in the actual multipath OTDR results. A further comparison of the actual multipath OTDR trace to the calculated or estimated trace may identify other expected trace results, or events. However, in the example situation in which a fiber break occurs on one port, the expected fiber end event for that port would be altered, and perhaps nonexistent. Consequently, the algorithm may determine a cable break at a distance corresponding to the observed event and on an output port determined by an altered or missing result.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive, or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM, or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, xn), to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations.

That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches, and gates, in order to optimize space usage or enhance performance of user equipment. A processor can also be implemented as a combination of computing processing units.

As used herein, terms such as "data storage," "data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature, or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. An optical time-domain reflectometer (OTDR) device, comprising:
    a processing system including a processor; and
    a memory that stores executable instructions that, when executed by the processing system, facilitate performance of operations, the operations comprising:
        determining a plurality of distinct timing offsets between an input port and each output port of a plurality of output ports of a multiport optical device to obtain a determined plurality of distinct timing offsets;

receiving an optical multipath return signal of a light-wave source signal injected at the input port of the multiport optical device, wherein the optical multipath return signal comprises a combination of a plurality of reflections, backscatter, or both, from a plurality of downstream optical fibers coupled to the plurality of output ports of the multiport optical device;

calculating a plurality of expected reflections, backscatter, or both based on configuration data to obtain expected results;

measuring a timing difference between one of the plurality of reflections, backscatter, or both of the optical multipath return signal and one of the expected reflections, backscatter, or both of the expected results;

associating the one of the plurality of reflections, backscatter, or both of the optical multipath return signal with one of the plurality of downstream optical fibers according to the timing difference to obtain an association, the associating comprising comparing the timing difference with the plurality of distinct timing offsets to obtain a comparison, wherein the comparison indicates a matching condition; and performing one or both of storing the association and presenting the association via a user interface.

2. The device of claim 1, wherein the light-wave source signal further comprises a pulse of light injected at an injection time.

3. The device of claim 2, the operations further comprising distinguishing one of the reflections, backscatter, or both from the plurality of reflections, backscatter, or both, the distinguishing comprising:

applying the optical multipath return signal to an optical-to-electrical transducer to obtain an electrical multipath return signal; and measuring a time difference between the injection time and a receipt time at a detector of the OTDR device.

4. The device of claim 1, wherein the operations further comprise associating the one of the reflections, backscatter, or both with one of the plurality of output ports.

5. The device of claim 1, wherein the determining of the plurality of distinct timing offsets comprises using manufacturer specified timing offsets.

6. The device of claim 1, wherein the multiport optical device comprises a filter.

7. The device of claim 1, wherein the multiport optical device comprises a 1:N optical power splitter.

8. The device of claim 7, wherein the determining of the plurality of distinct timing offsets comprises measuring a timing offset between an input port and each of the plurality of output ports of the 1:N optical power splitter.

9. The device of claim 8, wherein the timing offset is measured with an OTDR.

10. A non-transitory, machine-readable medium, comprising executable instructions that, when executed by a processing system of an optical time domain reflectometer (OTDR) including a processor, facilitate performance of operations, the operations comprising:

determining a plurality of distinct timing offsets between an input port and each output port of a plurality of output ports of a multiport optical device to obtain a determined plurality of distinct timing offsets;

receiving an optical multipath return signal of a light-wave source signal injected into the input port of the multiport optical device, wherein the optical multipath return signal comprises a combination of a plurality of reflections, backscatter, or both, from a plurality of downstream optical fibers coupled to the plurality of output ports of the multiport optical device;

estimating a plurality of expected reflections, backscatter, or both based on configuration data to obtain expected results;

determining a timing difference between one of the plurality of reflections, backscatter, or both of the optical multipath return signal and one of the expected reflections, backscatter, or both of the expected results;

associating the one of the plurality of reflections, backscatter, or both of the optical multipath return signal with one of the plurality of downstream optical fibers, according to the timing difference to obtain an association, the associating comprising comparing the timing difference with plurality of distinct timing offsets to obtain a comparison, wherein the comparison indicates a match; and performing one or both of storing the association and presenting the association via a user interface.

11. The non-transitory, machine-readable medium of claim 10, wherein the light-wave source signal further comprises a pulse of light injected at an injection time.

12. The non-transitory, machine-readable medium of claim 11, the operations further comprising distinguishing one of the reflections, backscatter, or both from the plurality of reflections, backscatter, or both, the distinguishing comprising:

applying the optical multipath return signal to an optical-to-electrical transducer to obtain an electrical multipath return signal; and measuring a time difference between the injection time and a receipt time at a detector of the OTDR.

13. The non-transitory, machine-readable medium of claim 10, wherein the operations further comprise associating the one of the reflections, backscatter, or both with one of the plurality of output ports.

14. The non-transitory, machine-readable medium of claim 11, wherein the determining of the plurality of distinct timing offsets comprises using manufacturer specified timing offsets.

15. A method, comprising:

determining, by a processing system including a processor of an optical time-domain reflectometer (OTDR), a plurality of distinct timing offsets between an input port and each output port of a plurality of output ports of a multiport optical device to obtain a determined plurality of distinct timing offsets;

obtaining, by the processing system, an optical multipath return signal of a light-wave source signal applied at the input port of the multiport optical device, wherein the optical multipath return signal comprises a combination of a plurality of reflections, backscatter, or both, from a plurality of downstream optical fibers optically coupled to the plurality of output ports of the multiport optical device;

estimating, by the processing system, a plurality of expected reflections, backscatter, or both based on configuration data to obtain expected results;

determining, by the processing system, a timing difference between one of the plurality of reflections, backscatter, or both of the optical multipath return signal and one of the expected reflections, backscatter, or both of the expected results;

associating, by the processing system, the one of the plurality of reflections, backscatter, or both of the optical multipath return signal with one of the plurality of downstream optical fibers according to the timing difference to obtain an association, the associating comprising comparing the timing difference with the determined plurality of distinct timing offsets to obtain a comparison, wherein the associating is responsive to the comparison indicating a match; and performing, by the processing system, one or both of storing the association and presenting the association via a user interface.

16. The method of claim 15, wherein the light-wave source signal further comprises a pulse of light injected at an injection time.

17. The method of claim 16, further comprising distinguishing, by the processing system, one of the reflections, backscatter, or both from the plurality of reflections, backscatter, or both, the distinguishing comprising:

applying, by the processing system, the optical multipath return signal to an optical-to-electrical transducer to obtain an electrical multipath return signal; and measuring, by the processing system, a time difference between the injection time and a receipt time at a detector of the OTDR.

18. The method of claim 15, further comprising associating, by the processing system, the one of the reflections, backscatter, or both with one output port of the plurality of output ports.

19. The method of claim 15, wherein the determining of the plurality of distinct timing offsets comprises using manufacturer specified timing offsets.

20. The method of claim 15, further comprising associating, by the processing system, the one of the reflections, backscatter, or both with one of the plurality of output ports.

* * * * *